W. KYLE.
LOCOMOTIVE DRIVING WHEEL.
APPLICATION FILED MAR. 25, 1921.
1,396,129.
Patented Nov. 8, 1921.
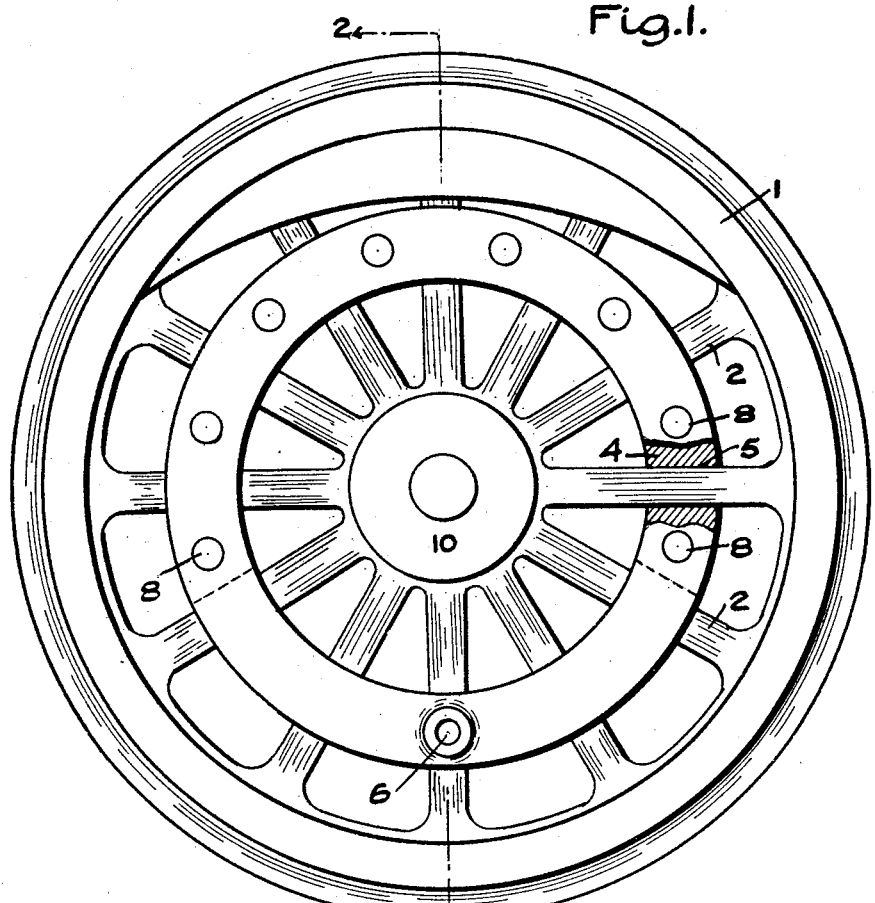
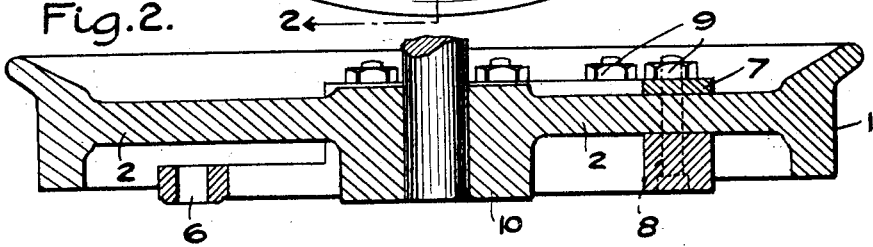
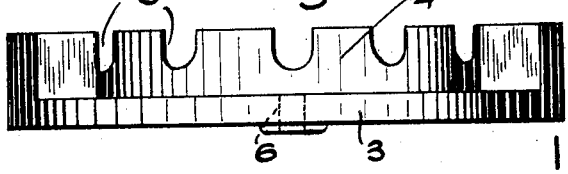
INVENTOR.
Wm. Kyle.
by Fetherstonhaugh Co.
Attys.

UNITED STATES PATENT OFFICE.

WILLIAM KYLE, OF BELLVILLE, ONTARIO, CANADA.

LOCOMOTIVE DRIVING-WHEEL.

1,396,129.

Specification of Letters Patent.   Patented Nov. 8, 1921.

Application filed March 25, 1921.   Serial No. 455,682.

*To all whom it may concern:*

Be it known that I, WILLIAM KYLE, a subject of the King of Great Britain, a resident of the city of Bellville, in the county of Hastings, in the Province of Ontario, Canada, have invented certain new and useful Improvements in Locomotive Driving Wheels, of which the following is the specification.

My invention relates to improvements in locomotive driving wheels and the object of the invention is to devise an attachment therefor by means of which the connecting rod can be connected to such wheel so that the pull on the wheel will be equal, whether the point of connection of the connecting rod with the wheel is at the lower or upper position, and consequently any tendency for the wheel to slip under normal loads will be obviated.

My invention consists of a wheel constructed and arranged substantially as hereinafter more particularly described and illustrated in the accompanying drawing in which:

Figure 1 represents a front view of a wheel constructed according to my invention showing the same broken away at one spoke to illustrate the means of connecting the attachment thereto.

Fig. 2 is a section through the line 2—2 (Fig. 1).

Fig. 3 is an inverted plan view of a portion of my attachment.

Like characters of reference indicate corresponding parts in the different views:

1 is a wheel. 2 are the spokes thereof. 3 is my attachment of preferably annular shape and having the inwardly extending web 4 for approximately half the diameter thereof, said inwardly extending web provided with the slots 5 for the reception of the spokes. 6 is a hole in the annular attachment for the reception of the pin for pivotally connecting the connecting rod thereto. 7 is a semicircular plate suitably secured to the web 4 by the bolts and nuts 8 and 9 respectively, the bolts 8 being preferably countersunk into the attachment 3.

The attachment is applied as follows:

The portion 3 is placed on the wheel concentrically with the hub 10, the spokes 2 fitting into the slots 5 in the web portion 4 thereof. The semicircular plate 7 is now applied on the inside of the wheel to the web 4 and held in place by threading the nuts 9 on the bolts 8.

The connecting rod being connected at the point 6 it will be seen that when the wheel is in the position shown in Fig. 1 instead of such connecting rod being connected in the ordinary manner there will be the leverage from the point of connection with the annular portion 3 to where the same is connected to the spokes, or in other words the upper half of the wheel. Consequently this will overcome the loss of leverage which occurs in ordinary locomotive wheels when the connection is at the bottom of the wheel.

By using my attachment the leverage will be equal and consequently any tendency for the wheel to slip under normal loads will be obviated.

Although I have shown my attachment of a certain specific form it is to be understood that it could with equal facility be constructed in many different ways. I do not desire to confine myself to the particular form illustrated. Further I have shown my device as applied to existing wheels whereas if the whole wheel were constructed according to my invention the attachment could be formed integrally therewith.

What I claim as my invention is:

1. The combination with a locomotive drive wheel, of an attachment secured to the spokes of the wheel for part of its circumference, said attachment being free of the spokes of the remaining part of the wheel, and means for pivotally connecting the connecting rod to the center of the free portion of the attachment.

2. The combination with a locomotive drive wheel, of an annular attachment having an inwardly extending web for part of its circumference, said web having a plurality of slots on its inner face for the reception of the spokes, means for securing the annular attachment to the spokes with such spokes in said slots and means for pivotally connecting the connecting rod to the center of the free portion of the attachment.

3. The combination with a locomotive drive wheel, of an annular attachment secured to the wheel for part of its circumference, and means for pivotally connecting the connecting rod to the center of the free portion of the attachment, the said means and the points of connection to the wheel being at equal radii from the center of the wheel.

4. The combination with a locomotive drive wheel, of an annular attachment having an inwardly extending web for half its circumference, said web having a plurality of slots on its inner face for the reception of the spokes, a semicircular plate, bolts extending through the web and through the plate for securing the attachment to such spokes, and means for connecting the connecting rod to the center of the remaining free portion of the annular attachment.

WILLIAM KYLE.